Figure 9:
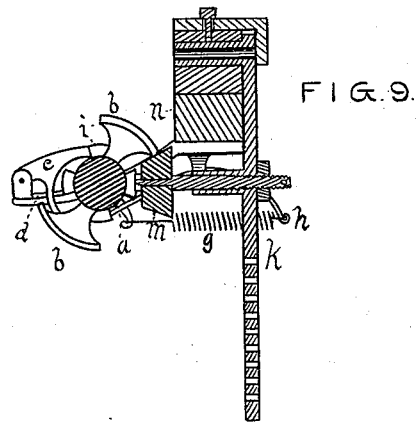

(No Model.) 3 Sheets—Sheet 1.
R. FARIES.
CHECK ROWER FOR CORN PLANTERS.
No. 326,282. Patented Sept. 15, 1885.
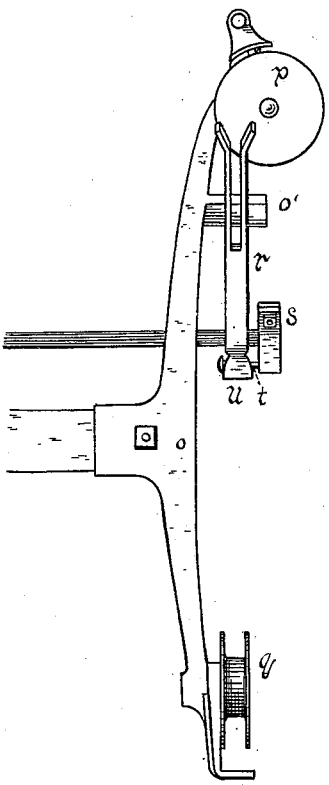
FIG. 1.
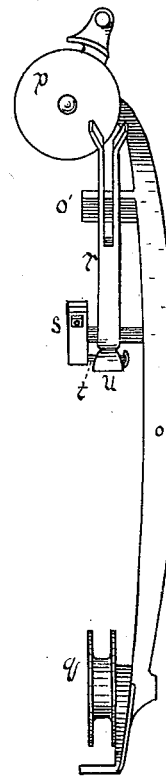
FIG. 2.
FIG. 3. FIG. 4. FIG. 5.
 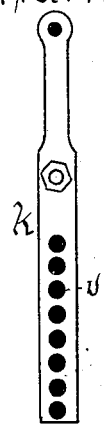 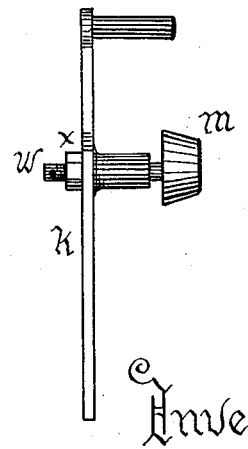
Witnesses.
C. C. Clark
J. N. Bills
Inventor
ROBERT FARIES.
By L. P. Graham
Atty.

(No Model.) 3 Sheets—Sheet 2.
R. FARIES.
CHECK ROWER FOR CORN PLANTERS.
No. 326,282. Patented Sept. 15, 1885.
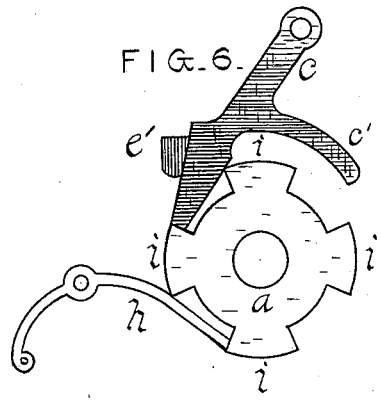
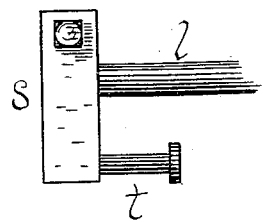
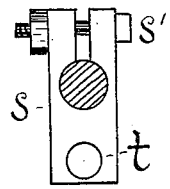
Witnesses.
C. C. Clark
J. N. Bills
Inventor.
Robert Faries.
By L. P. Graham
Atty.

(No Model.) 3 Sheets—Sheet 3.

R. FARIES
CHECK ROWER FOR CORN PLANTERS.

No. 326,282. Patented Sept. 15, 1885.

Witnesses.
C. C. Clark
J. P. Walker

Inventor
ROBERT FARIES.
By L. P. Graham,
atty.

UNITED STATES PATENT OFFICE.

ROBERT FARIES, OF DECATUR, ILLINOIS, ASSIGNOR TO THE FARMERS FRIEND MANUFACTURING COMPANY, OF DAYTON, OHIO.

CHECK-ROWER FOR CORN-PLANTERS.

SPECIFICATION forming part of Letters Patent No. 326,282, dated September 15, 1885.

Application filed September 24, 1884. (No model.)

*To all whom it may concern:*

Be it known that I, ROBERT FARIES, a resident of the city of Decatur, county of Macon, and State of Illinois, have invented certain new and useful Improvements in Check-Rowers for Corn-Planters, of which the following is a specification.

In the drawings accompanying and forming a part of this specification, Figure 1 is a plan of my machine. Fig. 2 is a bottom view of a portion of the same. Fig. 3 is a side view of the tappet used to operate the check-row shaft. Fig. 4 is a rear view of the lever used to operate the seed-slide of the planter, and Fig. 5 is a side view of Fig. 4. Fig. 6 shows the manner of effecting a lock in the check-rower, and Figs. 7 and 8 are details of the end of the check-row shaft. Fig. 9 is a vertical transverse section of my device at the longitudinal center of the cylinder.

$a$ represents a rotating cylinder provided with deflected projections $b$ and ratchet-teeth $i$.

$c$ are pawls that operate on ratchet-teeth $i$.

$d$ are arms rigidly attached to the check-row shaft $l$, and loosely connected with pawls $c$.

$e$ are brackets securely attached to the check-row bar $n$, and provided with bearings for shaft $l$ and cylinder $a$.

$f$ are levers extending downward and backward from shaft $l$.

$g$ are springs connecting levers $f$ with lock-pawls $h$.

$i$, as before stated, represents teeth on cylinder $a$, and I have found four on each end to be a satisfactory number.

$k$ represents a swinging lever, pivoted at its upper end and provided with a conical roller, $m$, which receives motion from the deflected projections $b$ on cylinder $a$.

$o$ are the cross-arms that support the guide-pulleys and outer ends of shaft $l$, and $o'$ are projections that limit the forward throw of the check-row tappets.

$p$ represents the receiving-pulley and $q$ the discharging-pulleys for the check-row wire.

$r$ is a check-row-wire tappet, bifurcated at its upper end in the customary manner to receive the check-row wire, provided with slot $r'$, that fits loosely over the end of the check-row shaft, and also bifurcated at its lower end to fit over projection $t$.

$s$ are blocks, constructed as indicated in Figs. 7 and 8, provided with projections $t$, and adapted to be adjusted on the shaft of the check-rower (for the purpose of regulating the stroke of tappets $r$) by means of adjusting-bolt $s'$.

$v$ shows a series of holes in lever $k$, the purpose of which is to regulate the stroke of the check-rower to conform to the throw of the seed-slide of the planter, and such regulation is effected by adjusting the rod that connects the slide with the lever higher or lower in the holes.

To effect a more delicate adjustment of the stroke, conical roller $m$ may be thrown to or from the cylinder $a$ by means of screw-bolt $w$ and securing-nut $x$. (See Fig. 5.)

On brackets $e$ are formed projections $e'$, the function of which will be hereinafter set forth.

Pawls $c$ have downward extensions $c'$, as indicated in Figs. 2 and 6, that prevent misplacement of said pawls with relation to the teeth $i$ on the cylinder.

The check-row shaft is formed in two separate parts, each of which has bearings in a bracket, $e$, and a cross-arm, $o$, and is adapted to operate entirely independent of the other.

In operation oscillating motion is imparted by the check-row-wire knots to one of the bifurcated tappets $r$ in the customary manner, and this motion is conveyed through an end of rod $l$ and an arm, $d$, to a pawl, $c$. Pawl $c$ produces intermittent rotary motion in cylinder $a$ by means of ratchet-teeth $i$, and at the termination of every quarter-revolution the said pawl strikes a projection, $e'$, and causes an absolute stop both in the shaft and the cylinder, (see Fig. 6, where the pawl is shown in contact with the projection $e'$, and a tooth of the cylinder in contact with the pawl.) Between strokes the conical roller $m$ is held from backward movement by the termination of a projection, $b$, stopping opposite its center. As cylinder $a$ rotates, projections $b$ throw roller $m$ and lever $k$ from side to side alternately, thereby producing motion that may be applied to operating the seed-slide of a planter, as heretofore set forth.

By means of the slot $r'$ and forked termination $u$ of tappet $r$ a greater amount of free lateral motion is given to the upper end of said tappet, thereby lessening the danger of breakage and premature dropping by kinks in the wire.

The operation of lock-pawls $h$ is indicated in Fig. 6, the end resting against a ratchet-tooth and entirely preventing backward motion, and the upper surface resting against another tooth and preventing forward motion to the extent of the strength of the spring $g$, with which such pawls are supplied.

The spring $g$ performs the quadruple function of returning pawl $c$ and tappet $r$ to their proper position after each stroke, of holding pawl $h$ always in contact with the ratchet-teeth of the cylinder, and, by their diagonal position, of holding both shaft $l$ and pawl $h$ in their bearings.

I claim as new and desire to secure by Letters Patent—

1. The combination, in a check-rower, of an oscillating lever, a shaft adapted to be partially rotated in reverse directions alternately by the oscillating lever, a cam-cylinder and ratchet loose on said shaft and adapted to be intermittently rotated in one direction by the shaft, and suitable means of conveying the motion of the cam-cylinder to the seed-slide of a planter, substantially as set forth.

2. The combination, in a check-rower, of an oscillating lever, a shaft adapted to be partially rotated in reverse directions alternately by the oscillating lever, a cam-cylinder and ratchet loose on said shaft and adapted to be intermittently rotated in one direction by the shaft, a swinging lever adapted to be oscillated by the cam-cylinder, and suitable means of conveying the motion of the swinging lever to the seed slide of a corn-planter, as set forth.

3. The combination, in a check-rower, of an oscillating lever adapted to be thrown in one direction by knots on a check-row wire, a shaft provided with a drive-pawl and adapted to be partially rotated in reverse directions alternately by the oscillating lever, a cam-cylinder provided with a ratchet-wheel and adapted to be intermittently rotated in one direction by the pawl on the shaft, suitable means of conveying the motion of the cam-cylinder to the seed-slide of a corn-planter, and suitable means of automatically returning the shaft and lever to their original position after the termination of every throw of the knots on the check-row wire, as set forth.

4. The combination, in a check-rower for corn-planters, of oscillating rod $l$, provided with rigid arm $d$, pawl $c$, hinged to the outer end of arm $d$, intermittently-rotating cylinder $a$, provided with ratchet-teeth $i$ and deflected projections $b$, and lever $k$, provided with a friction-roller, as and for the purpose set forth.

5. The combination of cylinder $a$, ratchets $i$, projections $b$, rod $l$, arm $d$, pawl $c$, lever $f$, pawl $h$, and spring $g$, extending from projection $f$ to pawl $h$, as and for the purpose set forth.

6. The combination, with intermittently-rotating cylinder $a$, having deflected projections $b$, and with a vibrating lever, $k$, of cone-shaped roller $m$, adapted to be adjusted with relation to the projections $b$ for the purpose of regulating the vibration of the lever $k$, substantially as set forth.

7. The combination, with tappet $r$, having slot $r'$ and bifurcated termination $u$, of adjustable block $s$, pin $t$, and shaft $l$, as and for the purpose set forth.

8. The combination of drive-pawl $c$, ratchet $i$, and rigid locking projection $e'$, located as described, so that the pawl will become interposed between the projection and a ratchet-tooth at the termination of every stroke and thereby effect an absolute stop both in the ratchet and pawl, substantially as and for the purpose set forth.

9. The combination, with a ratchet-wheel of a check-rower, of a spring-pawl adapted to fit against a ratchet-tooth and prevent backward movement, and also press against a following tooth and prevent forward motion to the extent of the strength of the spring, substantially as set forth.

ROBT. FARIES.

Attest:
C. C. CLARK,
L. P. GRAHAM.